(12) United States Patent
Fay, II

(10) Patent No.: US 12,446,487 B2
(45) Date of Patent: Oct. 21, 2025

(54) SIDE-SHIFTING REAR-MOUNTED MOWER WITH LOAD CELL SENSOR

(71) Applicant: CNH Industrial America LLC, New Holland, PA (US)

(72) Inventor: Jeffrey Fay, II, New Holland, PA (US)

(73) Assignee: CNH Industrial America LLC, New Holland, PA (US)

( * ) Notice: Subject to any disclaimer, the term of this patent is extended or adjusted under 35 U.S.C. 154(b) by 137 days.

(21) Appl. No.: 18/322,429

(22) Filed: May 23, 2023

(65) Prior Publication Data

US 2024/0389502 A1    Nov. 28, 2024

(51) Int. Cl.
*A01D 34/00*    (2006.01)
*A01D 101/00*   (2006.01)

(52) U.S. Cl.
CPC ........ *A01D 34/008* (2013.01); *A01D 2101/00* (2013.01)

(58) Field of Classification Search
CPC .............. A01D 34/008; A01D 2101/00; A01D 75/303; A01D 34/006; A01B 69/004
See application file for complete search history.

(56) References Cited

U.S. PATENT DOCUMENTS

| 6,758,031 B2 | 7/2004 | Franet et al. |
| 2006/0191250 A1 | 8/2006 | Neuerburg et al. |
| 2015/0051795 A1* | 2/2015 | Keys, II .......... B60W 30/18036 701/41 |
| 2021/0127551 A1* | 5/2021 | Priepke ................. A01B 69/008 |
| 2022/0279710 A1* | 9/2022 | Wieckhorst ............ A01B 71/02 |

FOREIGN PATENT DOCUMENTS

| DE | 102015221120 A1 * | 5/2016 | .......... A01B 69/003 |
| EP | 1 321 027 B1 | 6/2003 | |
| EP | 2018803 A1 * | 1/2009 | .......... A01B 69/006 |
| EP | 2710875 A1 * | 3/2014 | .......... A01D 34/664 |
| GB | 2580976 A * | 8/2020 | .......... A01B 63/002 |
| JP | 2012038238 A * | 2/2012 | |

OTHER PUBLICATIONS

EP-2710875-A1 (Fay J) (Mar. 26, 2014)(Machine Translation) (Year: 2014).*
JP-2012038238-A (Takahashi et al.) (Feb. 23, 2012) (Machine Translation) (Year: 2012).*

* cited by examiner

*Primary Examiner* — Hung Q Nguyen
(74) *Attorney, Agent, or Firm* — Foley & Lardner LLP

(57) ABSTRACT

A system including an agricultural vehicle, a rear-mounted mower coupled to the agricultural vehicle by a rear hitch, a front-mounted mower coupled to the agricultural vehicle by a front hitch, and a control system. The control system is configured to control the rear-mounted mower by obtaining a signal from a sensor positioned on the front hitch coupled to the front-mounted mower. Then assigning a value to the signal, determining if the value exceeds a threshold, transmitting an instruction to adjust the rear-mounted mower laterally, and executing the instruction by adjusting the rear-mounted mower laterally to a lateral position.

20 Claims, 9 Drawing Sheets

SIDE-SHIFTING REAR-MOUNTED MOWER WITH LOAD CELL SENSOR

BACKGROUND

This disclosure relates generally to agricultural vehicles configured with triple mowers. When mowing with triple mowers (with one front-mounted mower and two rear-mounted mowers) it is common to miss crop during turning due to a lack of overlap between the front-mounted mower and rear-mounted mowers. This can be mitigated by side-shifting the rear-mounted mowers. Measuring the steering angle is one method of determining how much the vehicle needs to side shift the rear-mounted mowers. But measuring the steering angle does not take into account ground speed and can thus lead to inaccurate side-shifting adjustments.

SUMMARY

What is needed is a novel input that can be measured and used to sense a turn and command a side-shift of the rear mowers. The location of the front-mounted mower, which is ahead of the front axle, results in high side-loading of the front-mounted mower due to the mower being dragged laterally across the ground during a turn. This side-loading can be used as an input to sense a turn and determine a required side-shift amount of the rear-mounted mowers.

One implementation of the present disclosure relates to a system. The system includes an agricultural vehicle; a rear-mounted mower coupled to the agricultural vehicle by a rear hitch; a front-mounted mower coupled to the agricultural vehicle by a front hitch; and a control system configured to control the rear-mounted mower, the control system comprising processing circuitry configured to: obtain a signal from a sensor, the sensor positioned on the front hitch coupled to the front-mounted mower; assign a value to the signal; determine if the value exceeds a threshold; upon determining that the value exceeds the threshold, transmit an instruction to adjust the rear-mounted mower laterally; and execute the instruction by adjusting the rear-mounted mower laterally to a lateral position.

According to an embodiment, the sensor is a load cell.

According to an embodiment, the sensor is configured to measure a lateral load exerted on the front-mounted mower.

According to an embodiment, the processing circuitry is further configured to obtain a second signal, from a second sensor positioned on the front hitch, wherein the second sensor is configured to measure a lateral load on the front-mounted mower.

According to an embodiment, the processing circuitry is further configured to adjust the rear-mounted mower to the lateral position by adjusting the rear hitch coupled to the rear-mounted mower.

According to an embodiment, the processing circuitry is further configured to, upon the value not exceeding the threshold, transmit a second instruction to adjust the rear-mounted mower laterally to a central position.

According to an embodiment, the processing circuitry is further configured to determine a steering angle from the value.

Another implementation of the present disclosure relates to a control system. The control system includes processing circuitry configured to obtain a signal from a sensor, the sensor positioned on a front hitch coupled to a front-mounted mower; assign a value to the signal; determine if the value exceeds a threshold; upon determining that the value exceeds the threshold, transmit an instruction to adjust a rear-mounted mower laterally; and execute the instruction by adjusting the rear-mounted mower laterally to a lateral position.

According to an embodiment, the sensor is a load cell.

According to an embodiment, the sensor is configured to measure a lateral load on the front-mounted mower.

According to an embodiment, the processing circuitry is further configured to obtain a second signal from a second sensor and assign a second value to the second signal.

According to an embodiment, the processing circuitry is further configured to adjust the rear-mounted mower to the lateral position by adjusting a rear hitch coupled to the rear-mounted mower.

According to an embodiment, the processing circuitry is further configured to, upon the value not exceeding the threshold, transmit a second instruction to adjust the rear-mounted mower laterally to a central position.

According to an embodiment, the processing circuitry is further configured to determine a steering angle from the value.

Another implementation of the present disclosure relates to a method. The method including: obtaining, by a processor, a signal from a sensor positioned on a front hitch coupled to a front-mounted mower; assigning, by the processor, a value to the signal; determining, by the processor, if the value exceeds a threshold; upon determining that the value exceeds the threshold, transmitting, by the processor, an instruction to adjust a rear-mounted mower laterally; and executing, by the processor, the instruction by adjusting the rear-mounted mower laterally to a lateral position.

According to an embodiment, the sensor is a load cell.

According to an embodiment, the sensor is configured to measure a lateral load on the front-mounted mower.

According to an embodiment, the method further includes obtaining, by the processor, from a second sensor positioned on the front-mounted mower, wherein the second sensor is configured to measure a lateral load on the front-mounted mower.

According to an embodiment, the method further including adjusting the rear-mounted mower to the lateral position by adjusting a rear hitch coupled to the rear-mounted mower.

According to an exemplary embodiment, the further including transmitting a second instruction to adjust the rear-mounted mower laterally to a central position upon the value not exceeding the threshold.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

BRIEF DESCRIPTION OF THE DRAWINGS

The disclosure will become more fully understood from the following detailed description, taken in conjunction with the accompanying figures, wherein like reference numerals refer to like elements, in which.

DETAILED DESCRIPTION

Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting. While the figures and detailed description of the present disclosure describe front- and rear-mounted mowers in a triple mower configuration, it should be understood that the present disclosure relates to side-pull and center-pivot mower configurations as well, both with and without a front-mounted mower.

According to an exemplary embodiment, the vehicle of the present disclosure includes tractive elements to propel the vehicle along a desired trajectory. In one embodiment, the vehicle includes a front hitch and a rear hitch. A front-mounted mower is coupled to the vehicle by the front hitch. At least one rear-mounted mower is coupled to the vehicle by the rear hitch. In some embodiments, two rear-mounted mowers are coupled to the vehicle by the rear hitch.

The vehicle is configured to shift the rear-mounted mower(s) laterally to increase overlap of the front and rear mowers during turns and while mowing on inclines. In one embodiment of the present disclosure, the vehicle may automatically compensate by side shifting the rear-mounted mower to increase overlap of the of the front mower with at least one of the rear-mounted mowers. In an exemplary embodiment, the rear-mounted mowers are shifted opposite the direction of the turn.

The present disclosure relates to using, in one embodiment, a sensor on the front hitch to determine when the vehicle is turning, what angle the vehicle is turning, and how fast the vehicle is turning in order to determine the appropriate amount to laterally adjust the rear-mounted mowers to ensure full mowing coverage during turning events and inclination events. In some embodiments, the sensor on the front hitch is a load cell. The load cell can measure a lateral load on the front mower due to a turning event or inclination event. This load can be converted, by a processor, into a determined steering angle and speed to determine how much to side shift the rear mowers. In some embodiments, two load cells are used on the front hitch to measure the lateral load. In some embodiments, the rear mowers are pivotably adjusted to increase overlap.

Overall Vehicle

Figure 1:
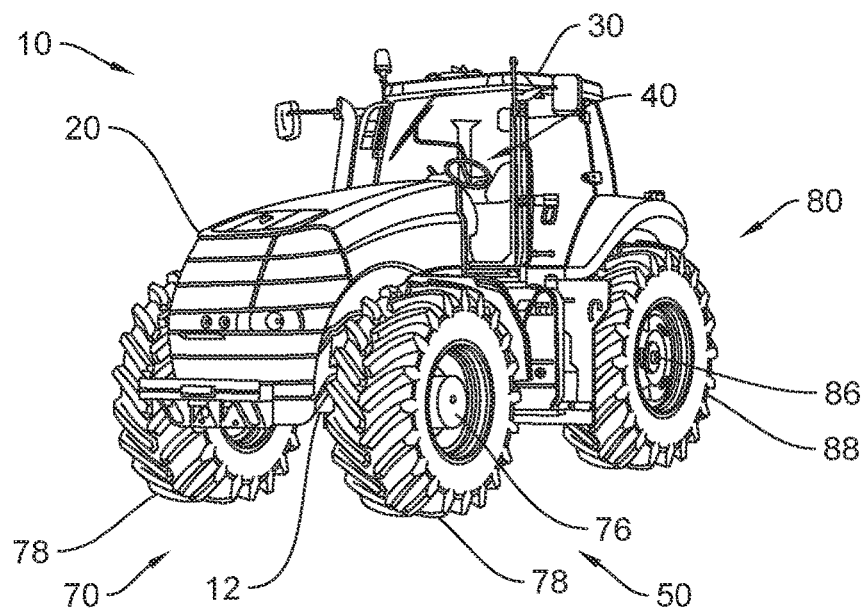
FIG. 1 is a perspective view of a vehicle, according to an exemplary embodiment.
Figure 2:
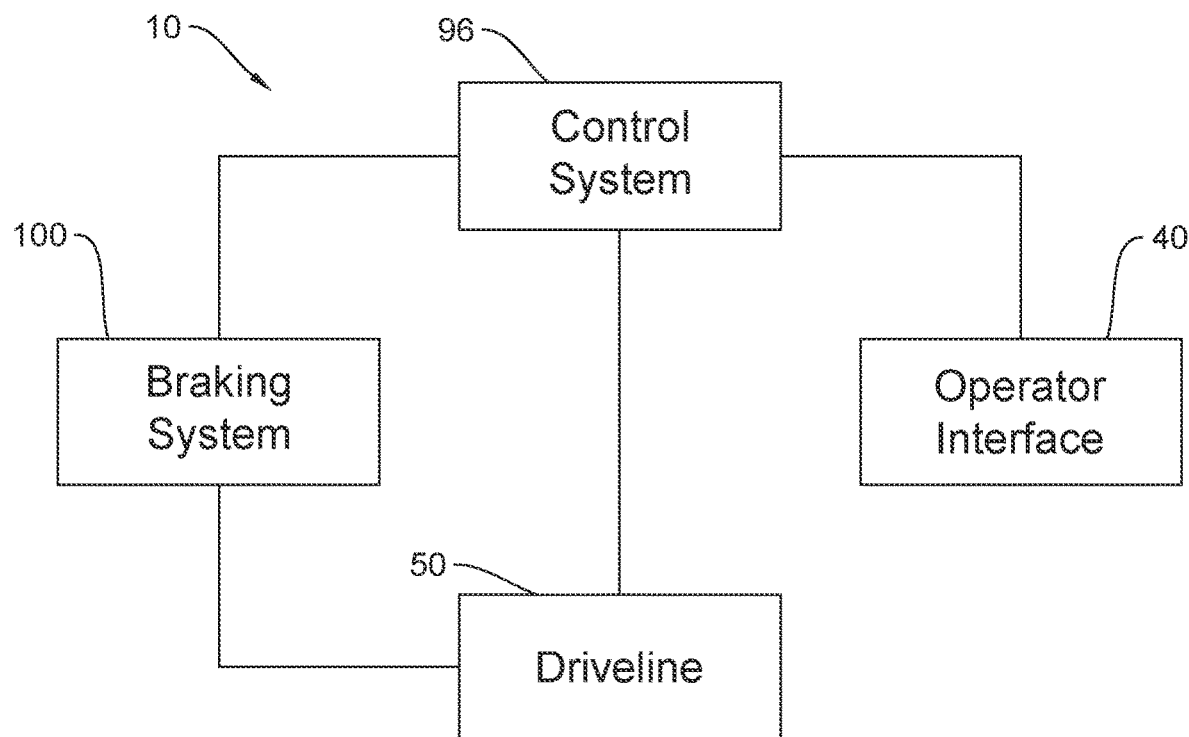
FIG. 2 is a schematic block diagram of the vehicle of FIG. 1, according to an exemplary embodiment.
Figure 3:
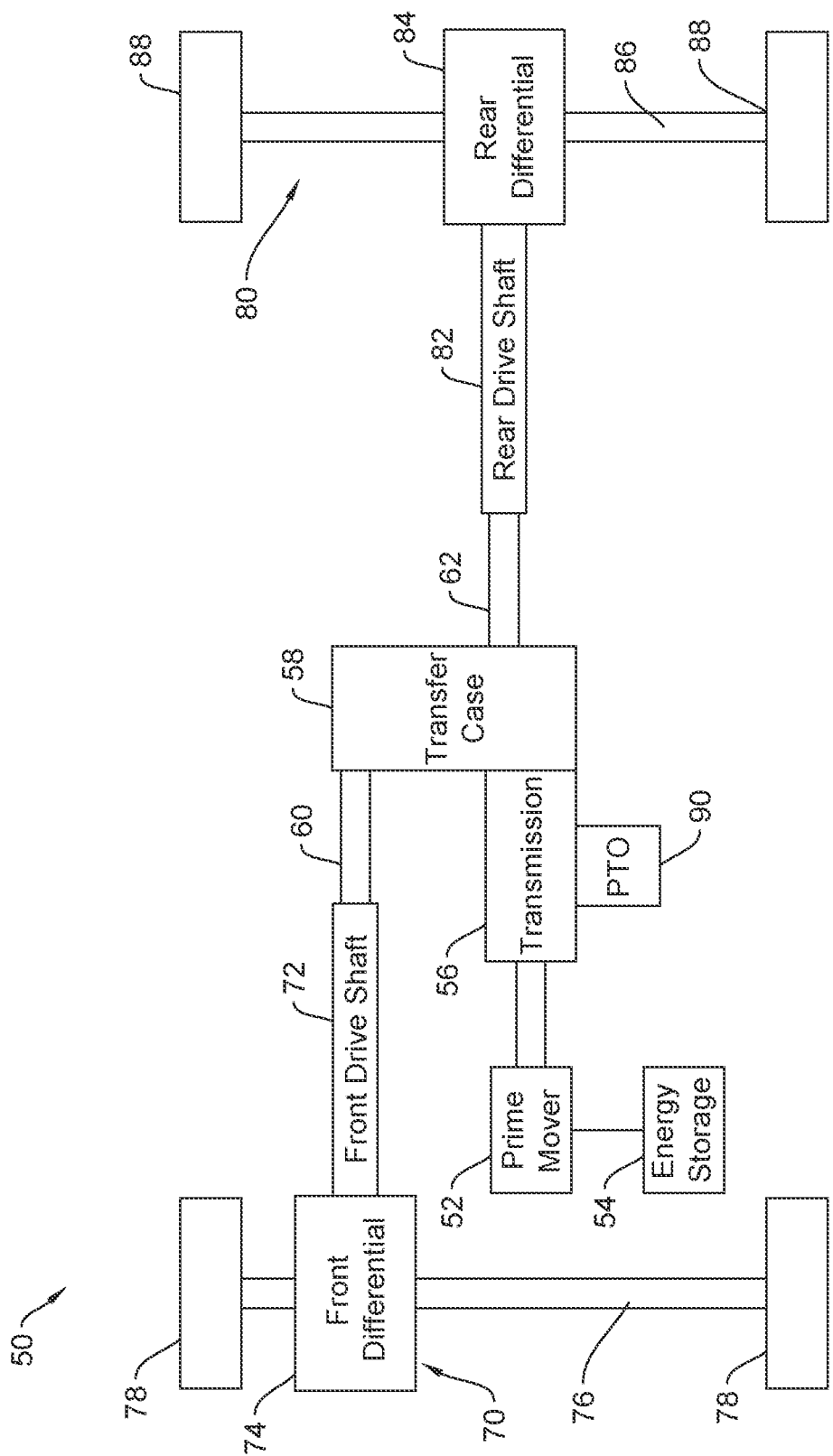
FIG. 3 is a schematic block diagram of a driveline of the vehicle of FIG. 1, according to an exemplary embodiment.

According to the exemplary embodiment shown in FIGS. 1-3, a machine or vehicle, shown as vehicle 10, includes a chassis, shown as frame 12; a body assembly, shown as body 20, coupled to the frame 12 and having an occupant portion or section, shown as cab 30; operator input and output devices, shown as operator interface 40, that are disposed within the cab 30; a drivetrain, shown as driveline 50, coupled to the frame 12 and at least partially disposed under the body 20; a vehicle braking system, shown as braking system 100, coupled to one or more components of the driveline 50 to facilitate selectively braking the one or more components of the driveline 50; and a vehicle control system, shown as control system 96, coupled to the operator interface 40, the driveline 50, and the braking system 100. In other embodiments, the vehicle 10 includes more or fewer components.

The chassis of the vehicle 10 may include a structural frame (e.g., the frame 12) formed from one or more frame members coupled to one another (e.g., as a weldment). Additionally or alternatively, the chassis may include a portion of the driveline 50. By way of example, a component of the driveline 50 (e.g., the transmission 56) may include a housing of sufficient thickness to provide the component with strength to support other components of the vehicle 10.

According to an exemplary embodiment, the vehicle 10 is an off-road machine or vehicle. In some embodiments, the off-road machine or vehicle is an agricultural machine or vehicle such as a tractor, a telehandler, a front loader, a combine harvester, a grape harvester, a forage harvester, a sprayer vehicle, a speedrower, and/or another type of agricultural machine or vehicle. In some embodiments, the off-road machine or vehicle is a construction machine or vehicle such as a skid steer loader, an excavator, a backhoe loader, a wheel loader, a bulldozer, a telehandler, a motor grader, and/or another type of construction machine or vehicle. In some embodiments, the vehicle 10 includes one or more attached implements and/or trailed implements such as a front mounted mower, a rear mounted mower, a trailed mower, a tedder, a rake, a baler, a plough, a cultivator, a rotavator, a tiller, a harvester, and/or another type of attached implement or trailed implement.

According to an exemplary embodiment, the cab 30 is configured to provide seating for an operator (e.g., a driver, etc.) of the vehicle 10. In some embodiments, the cab 30 is configured to provide seating for one or more passengers of the vehicle 10. According to an exemplary embodiment, the operator interface 40 is configured to provide an operator with the ability to control one or more functions of and/or provide commands to the vehicle 10 and the components thereof (e.g., turn on, turn off, drive, turn, brake, engage various operating modes, raise/lower an implement, etc.). The operator interface 40 may include one or more displays and one or more input devices. The one or more displays may be or include a touchscreen, a LCD display, a LED display, a speedometer, gauges, warning lights, etc. The one or more input device may be or include a steering wheel, a joystick, buttons, switches, knobs, levers, an accelerator pedal, a brake pedal, etc.

According to an exemplary embodiment, the driveline 50 is configured to propel the vehicle 10. As shown in FIG. 3, the driveline 50 includes a primary driver, shown as prime mover 52, and an energy storage device, shown as energy storage 54. In some embodiments, the driveline 50 is a conventional driveline whereby the prime mover 52 is an internal combustion engine and the energy storage 54 is a fuel tank. The internal combustion engine may be a spark-ignition internal combustion engine or a compression-ignition internal combustion engine that may use any suitable fuel type (e.g., diesel, ethanol, gasoline, natural gas, propane, etc.). In some embodiments, the driveline 50 is an electric driveline whereby the prime mover 52 is an electric motor and the energy storage 54 is a battery system. In some embodiments, the driveline 50 is a fuel cell electric driveline whereby the prime mover 52 is an electric motor and the energy storage 54 is a fuel cell (e.g., that stores hydrogen, that produces electricity from the hydrogen, etc.). In some embodiments, the driveline 50 is a hybrid driveline whereby (i) the prime mover 52 includes an internal combustion engine and an electric motor/generator and (ii) the energy storage 54 includes a fuel tank and/or a battery system.

As shown in FIG. 3, the driveline 50 includes a transmission device (e.g., a gearbox, a continuous variable transmission ("CVT"), etc.), shown as transmission 56, coupled to the prime mover 52; a power divider, shown as transfer case 58, coupled to the transmission 56; a first tractive assembly, shown as front tractive assembly 70, coupled to a first output of the transfer case 58, shown as front output 60; and a second tractive assembly, shown as rear tractive assembly 80, coupled to a second output of the transfer case 58, shown as rear output 62. According to an exemplary embodiment, the transmission 56 has a variety of configurations (e.g., gear ratios, etc.) and provides different output speeds relative to a mechanical input received thereby from the prime mover 52. In some embodiments (e.g., in electric driveline configurations, in hybrid driveline configurations, etc.), the driveline 50 does not include the transmission 56. In such embodiments, the prime mover 52 may be directly coupled to the transfer case 58. According to an exemplary embodiment, the transfer case 58 is configured to facilitate driving both the front tractive assembly 70 and the rear tractive assembly 80 with the prime mover 52 to facilitate front and rear drive (e.g., an all-wheel-drive vehicle, a four-wheel-drive vehicle, etc.). In some embodiments, the transfer case 58 facilitates selectively engaging rear drive only, front drive only, and both front and rear drive simultaneously. In some embodiments, the transmission 56 and/or the transfer case 58 facilitate selectively disengaging the front tractive assembly 70 and the rear tractive assembly 80 from the prime mover 52 (e.g., to permit free movement of the front tractive assembly 70 and the rear tractive assembly 80 in a neutral mode of operation). In some embodiments, the driveline 50 does not include the transfer case 58. In such embodiments, the prime mover 52 or the transmission 56 may directly drive the front tractive assembly 70 (i.e., a front-wheel-drive vehicle) or the rear tractive assembly 80 (i.e., a rear-wheel-drive vehicle).

As shown in FIGS. 1 and 3, the front tractive assembly 70 includes a first drive shaft, shown as front drive shaft 72, coupled to the front output 60 of the transfer case 58; a first differential, shown as front differential 74, coupled to the front drive shaft 72; a first axle, shown front axle 76, coupled to the front differential 74; and a first pair of tractive elements, shown as front tractive elements 78, coupled to the front axle 76. In some embodiments, the front tractive assembly 70 includes a plurality of front axles 76. In some embodiments, the front tractive assembly 70 does not include the front drive shaft 72 or the front differential 74 (e.g., a rear-wheel-drive vehicle). In some embodiments, the front drive shaft 72 is directly coupled to the transmission 56 (e.g., in a front-wheel-drive vehicle, in embodiments where the driveline 50 does not include the transfer case 58, etc.) or the prime mover 52 (e.g., in a front-wheel-drive vehicle, in embodiments where the driveline 50 does not include the transfer case 58 or the transmission 56, etc.). The front axle 76 may include one or more components.

As shown in FIGS. 1 and 3, the rear tractive assembly 80 includes a second drive shaft, shown as rear drive shaft 82, coupled to the rear output 62 of the transfer case 58; a second differential, shown as rear differential 84, coupled to the rear drive shaft 82; a second axle, shown rear axle 86, coupled to the rear differential 84; and a second pair of tractive elements, shown as rear tractive elements 88, coupled to the rear axle 86. In some embodiments, the rear tractive assembly 80 includes a plurality of rear axles 86. In some embodiments, the rear tractive assembly 80 does not include the rear drive shaft 82 or the rear differential 84 (e.g., a front-wheel-drive vehicle). In some embodiments, the rear drive shaft 82 is directly coupled to the transmission 56 (e.g., in a rear-wheel-drive vehicle, in embodiments where the driveline 50 does not include the transfer case 58, etc.) or the prime mover 52 (e.g., in a rear-wheel-drive vehicle, in embodiments where the driveline 50 does not include the transfer case 58 or the transmission 56, etc.). The rear axle 86 may include one or more components. According to the exemplary embodiment shown in FIG. 1, the front tractive elements 78 and the rear tractive elements 88 are structured as wheels. In other embodiments, the front tractive elements 78 and the rear tractive elements 88 are otherwise structured (e.g., tracks, etc.). In some embodiments, the front tractive elements 78 and the rear tractive elements 88 are both steerable. In other embodiments, only one of the front tractive elements 78 or the rear tractive elements 88 is steerable. In still other embodiments, both the front tractive elements 78 and the rear tractive elements 88 are fixed and not steerable.

In some embodiments, the driveline 50 includes a plurality of prime movers 52. By way of example, the driveline 50 may include a first prime mover 52 that drives the front tractive assembly 70 and a second prime mover 52 that drives the rear tractive assembly 80. By way of another example, the driveline 50 may include a first prime mover 52 that drives a first one of the front tractive elements 78, a second prime mover 52 that drives a second one of the front tractive elements 78, a third prime mover 52 that drives a first one of the rear tractive elements 88, and/or a fourth prime mover 52 that drives a second one of the rear tractive elements 88. By way of still another example, the driveline 50 may include a first prime mover that drives the front tractive assembly 70, a second prime mover 52 that drives a first one of the rear tractive elements 88, and a third prime mover 52 that drives a second one of the rear tractive elements 88. By way of yet another example, the driveline 50 may include a first prime mover that drives the rear tractive assembly 80, a second prime mover 52 that drives a first one of the front tractive elements 78, and a third prime mover 52 that drives a second one of the front tractive elements 78. In such embodiments, the driveline 50 may not include the transmission 56 or the transfer case 58.

As shown in FIG. 3, the driveline 50 includes a power-take-off ("PTO"), shown as PTO 90. While the PTO 90 is shown as being an output of the transmission 56, in other embodiments the PTO 90 may be an output of the prime mover 52, the transmission 56, and/or the transfer case 58. According to an exemplary embodiment, the PTO 90 is configured to facilitate driving an attached implement and/or a trailed implement of the vehicle 10. In some embodiments, the driveline 50 includes a PTO clutch positioned to selectively decouple the driveline 50 from the attached implement and/or the trailed implement of the vehicle 10 (e.g., so that the attached implement and/or the trailed implement is only operated when desired, etc.).

According to an exemplary embodiment, the braking system 100 includes one or more brakes (e.g., disc brakes, drum brakes, in-board brakes, axle brakes, etc.) positioned to facilitate selectively braking (i) one or more components of the driveline 50 and/or (ii) one or more components of a trailed implement. In some embodiments, the one or more brakes include (i) one or more front brakes positioned to facilitate braking one or more components of the front tractive assembly 70 and (ii) one or more rear brakes positioned to facilitate braking one or more components of the rear tractive assembly 80. In some embodiments, the one or more brakes include only the one or more front brakes. In some embodiments, the one or more brakes include only the one or more rear brakes. In some embodiments, the one or more front brakes include two front brakes, one positioned to facilitate braking each of the front tractive elements 78. In some embodiments, the one or more front brakes include at least one front brake positioned to facilitate braking the front axle 76. In some embodiments, the one or more rear brakes include two rear brakes, one positioned to facilitate braking each of the rear tractive elements 88. In some embodiments, the one or more rear brakes include at least one rear brake positioned to facilitate braking the rear axle 86. Accordingly, the braking system 100 may include one or more brakes to facilitate braking the front axle 76, the front tractive elements 78, the rear axle 86, and/or the rear tractive elements 88. In some embodiments, the one or more brakes additionally include one or more trailer brakes of a trailed implement attached to the vehicle 10. The trailer brakes are positioned to facilitate selectively braking one or more axles and/or one more tractive elements (e.g., wheels, etc.) of the trailed implement.

Side-Shifting Adjustment

Figure 4A:
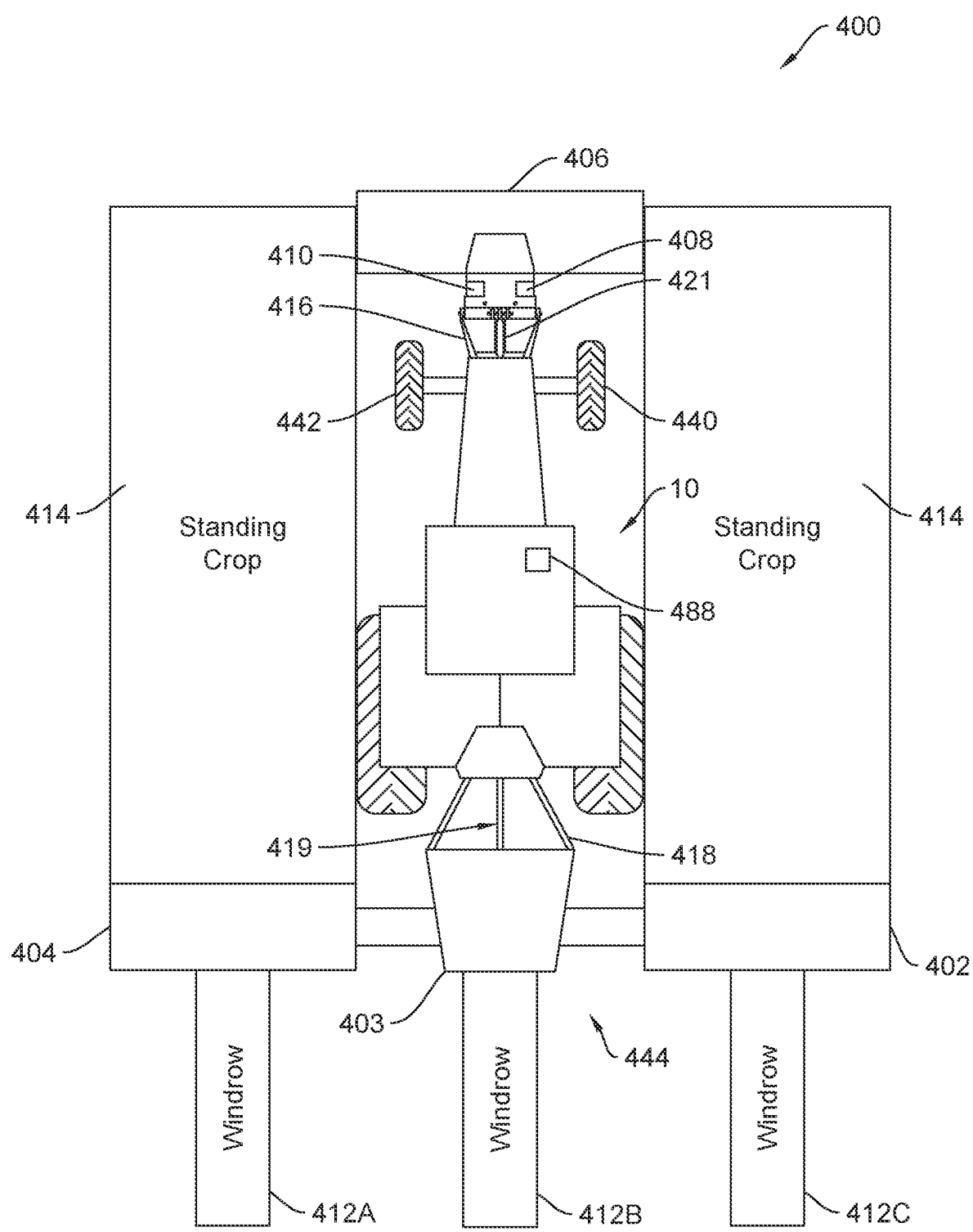
FIG. 4A illustrates the vehicle of FIG. 1 operating in a straight orientation, according to an exemplary embodiment.
Figure 4B:
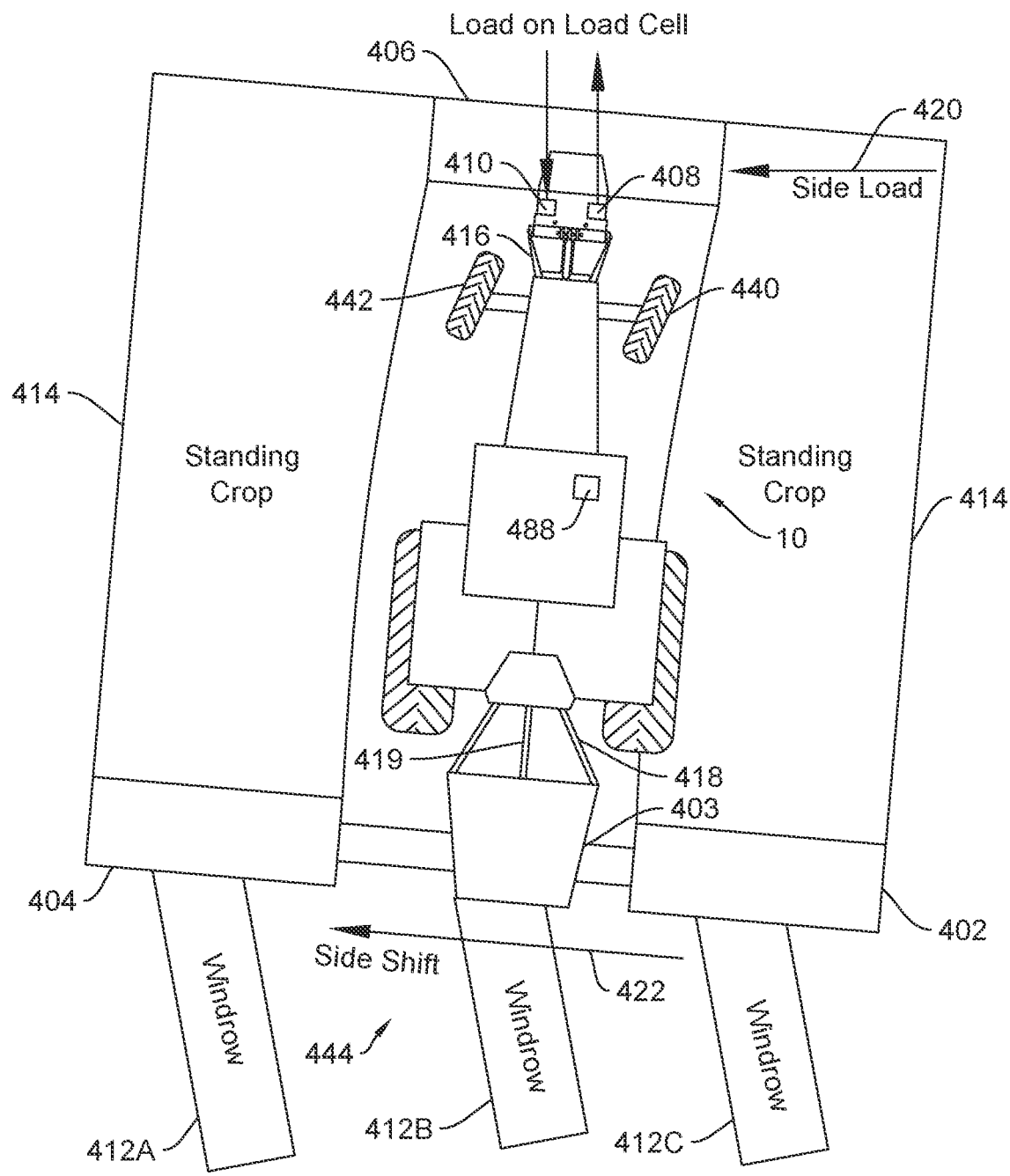
FIG. 4B illustrates the vehicle of FIG. 1 operating in a right-hand turning event, according to an exemplary embodiment.
Figure 4C:
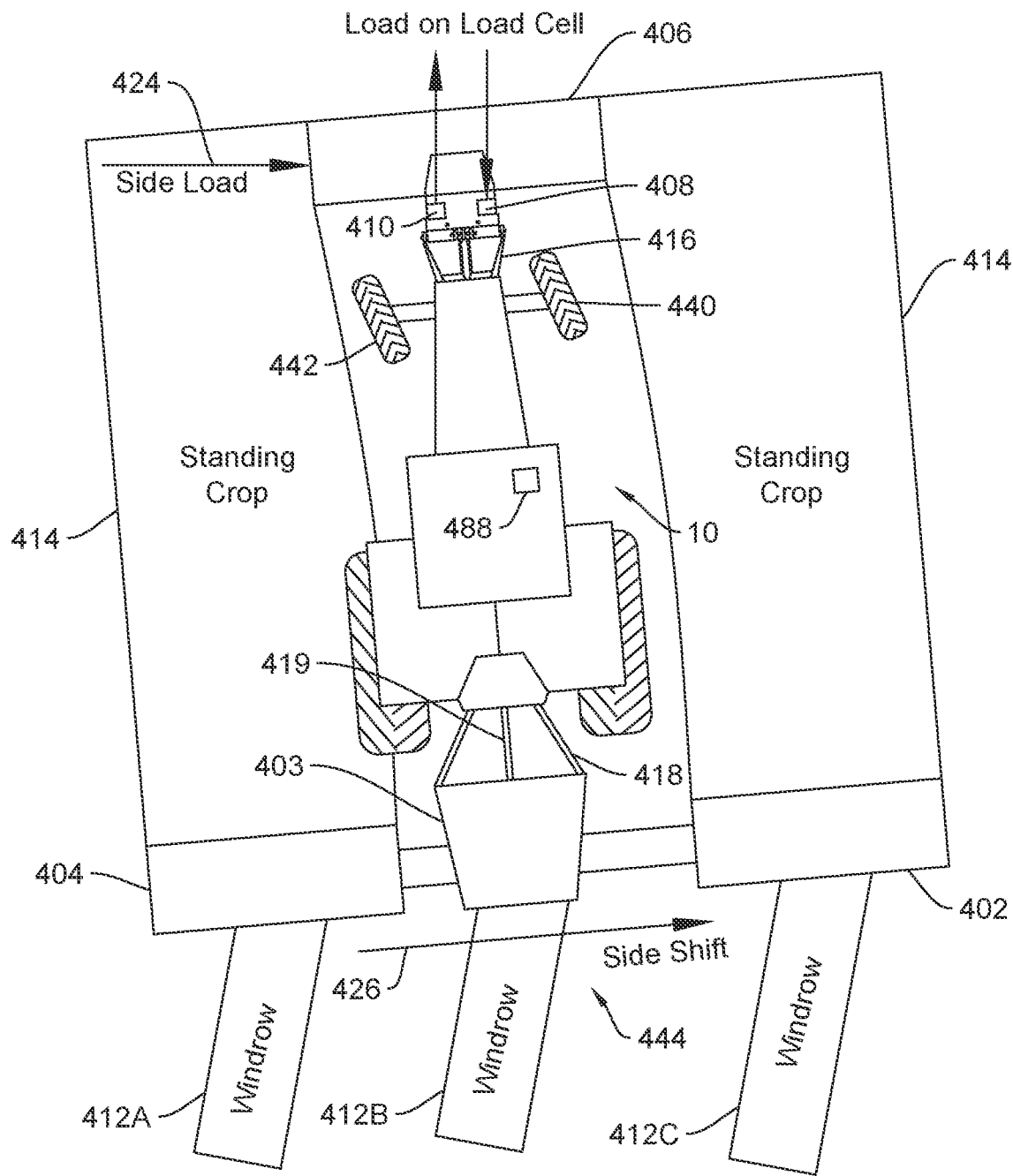
FIG. 4C illustrates the vehicle of FIG. 1 operating in a left-hand turning event, according to an exemplary embodiment.

Turning now to FIGS. 4A-4C, a side-shift system 400 for side shifting a rear-mounted mower to compensate during a turning event is shown. The side-shift system 400 includes the vehicle 10 of FIG. 1, a front-mounted mower 406, a rear-mounted mower 444 (including a right rear-mounted mower 402 and a left rear-mounted mower 404), a front hitch 416, a rear hitch 418, a right load cell 408, and a left load cell 410. In some embodiments, the front-mounted mower 406 and the rear-mounted mowers 444 are implements other than mowers. For example, they may be rakes, plows, harrows, seeders, cultivators, sprayers, balers, etc.

The vehicle 10 may be the vehicle 10 of FIG. 1. In some embodiments, vehicle 10 is a tractor with a front hitch 416 and a rear hitch 418. The rear hitch 418 may be a three-point hitch, a drawbar, or any other suitable means for coupling an implement to a vehicle 10. The three-point hitch is a hydraulic system 488 that allows implements (such as mowers) to be raised and lowered, as well as adjusted side-to-side. Mowers that use a three-point hitch may be powered by the vehicle's 10 rear PTO 419. The three-point hitch is named for the three attachment points that it uses: two lower hitch points on the rear of the vehicle and a top link that connects to the implement.

The lower hitch points are two arms that extend from the vehicle and are designed to fit into slots on the implement. The top link is a shorter arm that connects the vehicle to the implement and allows for side-to-side adjustment. The three-point hitch is operated by hydraulic cylinders that are controlled by the vehicle's hydraulic system 488. The drawbar is a metal bar that extends from the vehicle 10 and is attached to the implement with a hitch pin or a clevis.

The vehicle 10 may also comprise a rear PTO 419 to drive the rear-mounted mowers 444. In some embodiments, the rear PTO 419 is attached to the rear-mounted mowers 444 by a PTO shaft that matches the size of the vehicle's 10 rear PTO 419. In some embodiments, the PTO shaft has a splined shaft and locking collar that couples to the vehicle's 10 rear PTO 419 to transfer the rear PTO 419 rotation to the rear-mounted mowers 444. Because in some embodiments, the rear-mounted mowers 444 is comprised of two portions, the left rear-mounted mower 404 and the right rear-mounted mower 402. A gearing mechanism coupled to the PTO shaft may be used to convert the rear PTO 419 rotation to rotational motion at both left rear-mounted mower 404 and right rear-mounted mower 402. The gearing mechanism may be housed in a center member 403 of the rear-mounted mowers 444. Alternatively, a hydraulic system 488 may be used to power and actuate the rear-mounted mowers 444. The hydraulic system 488 may be housed locally on the vehicle 10 or may be housed on the rear-mounted mowers 444. The right rear-mounted mower 402 and the left rear-mounted mower 404 may articulate independently of each other to follow the contours of the ground upon which the rear-mounted mowers 444 is mowing. Each rear-mounted mower 402, 404, may pivot, raise, lower, and laterally adjust independent of the other.

The front-mounted mower 406 may be mounted on the front hitch 416 of the vehicle 10. The front hitch 416 may be a front-end loader, according to some embodiments. In other embodiments, the front-mounted mower 406 may be coupled to the vehicle 10 by a three-point hitch system, as in the rear. As in the rear, the cutting mechanism of the front-mounted mower 406 may be driven by a front PTO 421 and coupled to the front PTO 421 by a front PTO 421 shaft. The front-mounted mower 406 may articulate to pivot about a longitudinal axis of the vehicle 10 to allow the front-mounted mower 406 to follow the contours of the ground. Front-mounted mower 406 may also be adjusted vertically, laterally, and be pivoted through the use of hydraulics, electric actuators, or mechanical mechanism.

Figure 6:
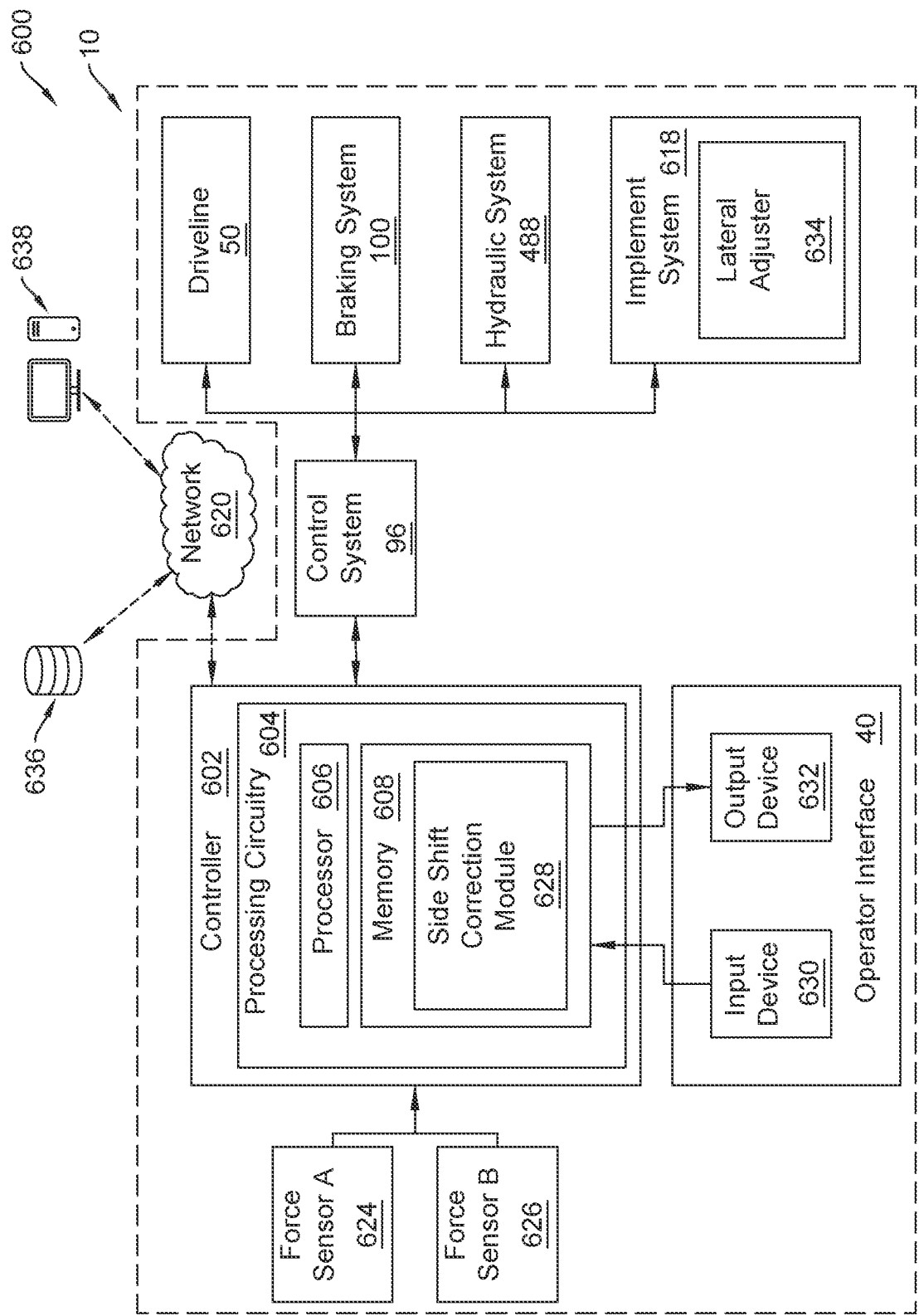
FIG. 6 is a schematic diagram of a lateral-adjustment system of FIG. 1, according to an exemplary embodiment.

The load cells 408, 410 may be attached to the front hitch 416. In some embodiments, the load cells 408, 410 are coupled to the front hitch 416 in a position where the front-mounted mower 406 is coupled to the front hitch 416. The load cells 408, 410 are configured to measure the lateral load on the front-mounted mower 406. As further described in FIGS. 4B-4C, as the vehicle 10 turns, the connection point between the front-mounted mower 406 and the front hitch 416 experiences a lateral load because the front-mounted mower 406 is dragged laterally along the ground. This lateral load may be measured and used to determine a turning radius of the vehicle 10. Further, the load measured may be used to determine a steering angle of the vehicle 10. In an exemplary embodiment, the greater the lateral load the greater the steering angle (i.e., the smaller the turning radius). A processor, as shown in FIG. 6, may receive the measurement of the load cells 408, 410 and convert the received measurements to a steering angle. This determined steering angle is then used, by the processor, to determine a side-shifting adjustment of the rear-mounted mowers 444 to ensure an acceptable or optimal overlap of the mowing swaths of the front-mounted mower 406 and the rear-mounted mowers 444.

Load cells 408, 410 may be transducers that are used to convert force or weight into an electrical signal. Load cells 408, 410 may work by measuring the deformation, or strain, of a material when a force is applied to it. The load cells 408, 410 may be made of a metal, such as steel or aluminum, and may be coupled to a strain gauge. The strain gauge is a thin metal wire or foil that is coupled (such as by an adhesive) to the surface of the load cell and is designed to change its resistance when the load cell is deformed (e.g., by tension or compression).

When a force is applied to the load cells 408, 410, the strain gauge experiences a change in resistance, which is proportional to the amount of deformation. This change in resistance is then converted into an electrical signal, which is typically in the form of a voltage or current.

The electrical signal from the load cells 408, 410 is then sent to the controller (as shown in FIG. 6) to be processed by a signal conditioner, which amplifies the signal and applies any necessary calibration or adjustments. The signal is then sent to a display or data acquisition system, where it can be recorded, analyzed, or used to control other equipment (e.g., mowers).

In some embodiments, the load cells are removeably or fixedly coupled to the suspension of the front-mounted mower 406.

While load cells 408, 410 are described in the current disclosure as being used to measure a lateral load exerted on front-mounted mower 406 and front hitch 416, it should be understood that any suitable force or acceleration sensor may be used in place of load cells 408, 410 in various implementations of the current disclosure.

For example, strain gauges, pressure sensors, piezoelectric sensors, capacitive sensors, and optical sensors may be used in place of load cells 408, 410.

A strain gauge may be used to measure the deformation or strain of the front hitch 416 when a force is applied to it. A pressure gauge may be used to measure the pressure of a fluid in a hydraulic line coupling the front hitch 416 (or front-mounted mower 406) to a hydraulic system 488 of vehicle 10. For example, the hydraulic line may be used to adjust the position of the front-mounted mower 406 or front hitch 416 by actuating hydraulic cylinders in the front hitch 416 or front-mounted mower 406. The pressure sensors may measure an amount of pressure required to maintain a position of the front-mounted mower 406 or front hitch 416 and convert that required pressure (through a calibration) to a determined lateral load (e.g., lateral load 420 of FIG. 4B) being applied to the front-mounted mower 406.

A piezoelectric sensor may be used to measure contact between components of the front-mounted mower 406, between components of the front hitch 416, or between components of the front-mounted mower 406 and front hitch 416. For example, upon two components touching and actuating the piezoelectric sensor, the piezoelectric sensor may transmit an electric signal to the processor. The processor may determine that a lateral load is being applied to the front mower due to the two components touching. In some embodiments, the processor may determine a minimum force threshold that must be applied to cause the components to touch (and thus actuate the piezoelectric sensor), for example, if the two components are separated by a spring or a dampener. In such an embodiment, the processor may determine a minimum amount of force required to cause the two components separated by the spring and/or dampener to touch. In a similar method, a capacitive sensor may be used to determine a lateral load applied to the front-mounted mower 406.

In some embodiments, the sensor is used to determine simply that a lateral force is being applied to the front-mounted mower 406. In other embodiments, the sensor is used to determine an amount of lateral force being applied to the front-mounted mower 406.

In FIG. 4A, the vehicle 10 is shown traveling in a straight path. A tractive element 440, 442 is in a neutral orientation and not steering to the either side. When the tractive elements 440, 442 are in the neutral position on level ground, the left load sensor 410 and the right load sensor 408 sense very little lateral load. In this orientation, a cutting swath of the front-mounted mower 406 and the rear-mounted mowers 444 overlap. Thus, there is no need for a side shift adjustment. The front-mounted mower 406 leaves two standing crop portions 414 for the rear-mounted mowers 444 to mow, leaving windrows 412A-C. In the neutral position on level ground, the rear-mounted mowers 444 are in also in a neutral position. In some embodiments, the neutral position of the rear-mounted mowers 444 is a center position, however, in some embodiments, the neutral position may be a lateral-offset position based on the mower configuration (e.g., when using a side mower).

Turning now to FIG. 4B, the vehicle 10 is shown in a right-hand turning event. In the right-hand turn, the load cells 408, 410 sense a lateral load 420. For example, as the vehicle 10 turns right by steering the tractive elements 440, 442 to the right, the front-mounted mower 406 is laterally dragged to the right which causes a lateral load 420 to be exerted on the mower in a direction opposite the turn (i.e., a lateral load exerted on the mower to the left). In a right-hand turning event, the left load sensor 410 will sense compression between the front-mounted mower 406 and the front hitch 416. In a left-hand turning event, the left load sensor 410 will sense tension between the front-mounted mower 406 and the front hitch 416.

When the load sensor 408 is in tension and the load sensor 410 is in compression, the processor may determine that the vehicle 10 is in a right-hand turn. The lateral-adjustment control system, as shown in more detail in FIG. 6, may be calibrated to the measured lateral load 420 to determine a steering angle, speed, steering magnitude, turn trajectory, turn radius, etc. In this way, the load sensors 408, 410 may measure the lateral load 420, transmit a signal representative of the lateral load 420 to a processor, and the processor may determine (based on the calibration) how much the vehicle 10 is turning. The processor then determines an amount to side shift 422 the rear mowers 444 to compensate for the turn and ensure all standing crop 414 is mowed. In some embodiments, the processor may determine to side shift 422 only one of the rear-mounted mowers 404, 402 (e.g., only the right rear-mounted mower 402 in a right-hand turning event).

The rear-mounted mowers 444 may be shifted any number of ways suitable in the art. In one embodiment, a three-point hitch to which the rear-mounted mowers 444 are coupled is adjusted to shift the rear-mounted mowers 444 laterally to compensate during a turn. In other embodiments, the center member 403 includes actuators to shift the rear-mounted mowers 444.

A three-point hitch may be an electrical or hydraulic system 488 used on vehicle 10 to attach and control agricultural implements, such as the front- and rear-mounted mowers 406, 444. It is a mechanism that allows implements to be raised and lowered and adjusted side-to-side. Lateral adjustment of the implement attached to a three-point hitch is typically achieved by extending and retracting the links of the three-point hitch, using a draw bar, or other actuators to adjust the hitch to the side.

The top link is a shorter arm that connects the vehicle 10 to the implement and may be used for side-to-side adjustment. To adjust the implement laterally, the operator can use the vehicle's hydraulic system 488 to raise or lower one side of the implement, and then adjust the length of the top link to tilt the implement to the desired angle. This allows the implement to follow the contour of the ground or to compensate for uneven terrain or turning events.

The vehicle 10 may also have a hydraulic system 488 that allows for automatic lateral adjustment of implements. Vehicle 10 may use sensors (e.g., load sensor 408, 410) or GPS technology to detect changes in the terrain or turning events and adjust the position of the implement accordingly.

In addition to lateral adjustment, a three-point hitch can also be used to adjust the implement's height and depth. Height adjustment is typically achieved using the hydraulic system 488 to raise or lower the implement, while depth adjustment is achieved by adjusting the position of the lower hitch points.

Alternatively, the rear-mounted mowers 444 may be adjusted laterally through the use of a drawbar. The drawbar connection may be used to attach pull-type mowers, and lateral adjustment is typically achieved by adjusting the position of the vehicle 10.

To adjust a pull-type mower laterally, the operator can adjust the angle of the vehicle's 10 front tractive elements 440, 442 to steer the vehicle to the side. This may cause the mower to move to the side as well.

In some cases, the pull-type mower itself may be equipped with a lateral adjustment mechanism. This may involve a sliding hitch or an actuated front wheel that allows the implement to move laterally. The operator can adjust the mechanism to move the implement left or right as needed. In some embodiments, the processor may automatically adjust the sliding hitch or actuated front wheel to adjust the pull-type mower laterally.

Turning now to FIG. 4C, the vehicle 10 is shown in a left-hand turning event. In the left-hand turning event, the load cells 408, 410 sense a lateral load 424. For example, as the vehicle 10 turns left by steering the tractive elements 440, 442 to the left, the front-mounted mower 406 is laterally dragged to the left which causes a lateral load 424 to be exerted on the mower in a direction opposite the turn (i.e., a lateral load exerted on the mower to the right). In the left-hand turn, the right load sensor 408 will sense compression between the front-mounted mower 406 and the front hitch 416. In the left-hand turn, the left load sensor 410 will sense tension between the front-mounted mower 406 and the front hitch 416.

When the load sensor 408 is in compression and the load sensor 410 is in tension, the processor may determine that the vehicle 10 is in a left-hand turning event. The lateral-adjustment control system 600, as shown in more detail in FIG. 6, may be calibrated to measure lateral load 424 to determine a steering angle, speed, steering magnitude, turn trajectory, turn radius, etc. In this way, the load sensors 408, 410 may measure the lateral load 424 exerted on the front-mounted mower 406, transmit a signal representative of the lateral load 424 to a processor, and the processor may determine (based on the calibration) how much the vehicle 10 is turning. The processor then determines an amount to side shift 426 the rear mowers 444 to compensate for the turn and ensure all standing crop 414 is mowed. In some embodiments, the processor may determine to side shift 422 only one of the rear-mounted mowers 402, 404.

As described in FIG. 4B, the rear-mounted mowers 444 may be similarly adjusted laterally in a number of methods and ways.

In some embodiments, the vehicle 10 only use a single load cell to determine the direction and/or magnitude of the turn of the vehicle 10.

Figure 5:
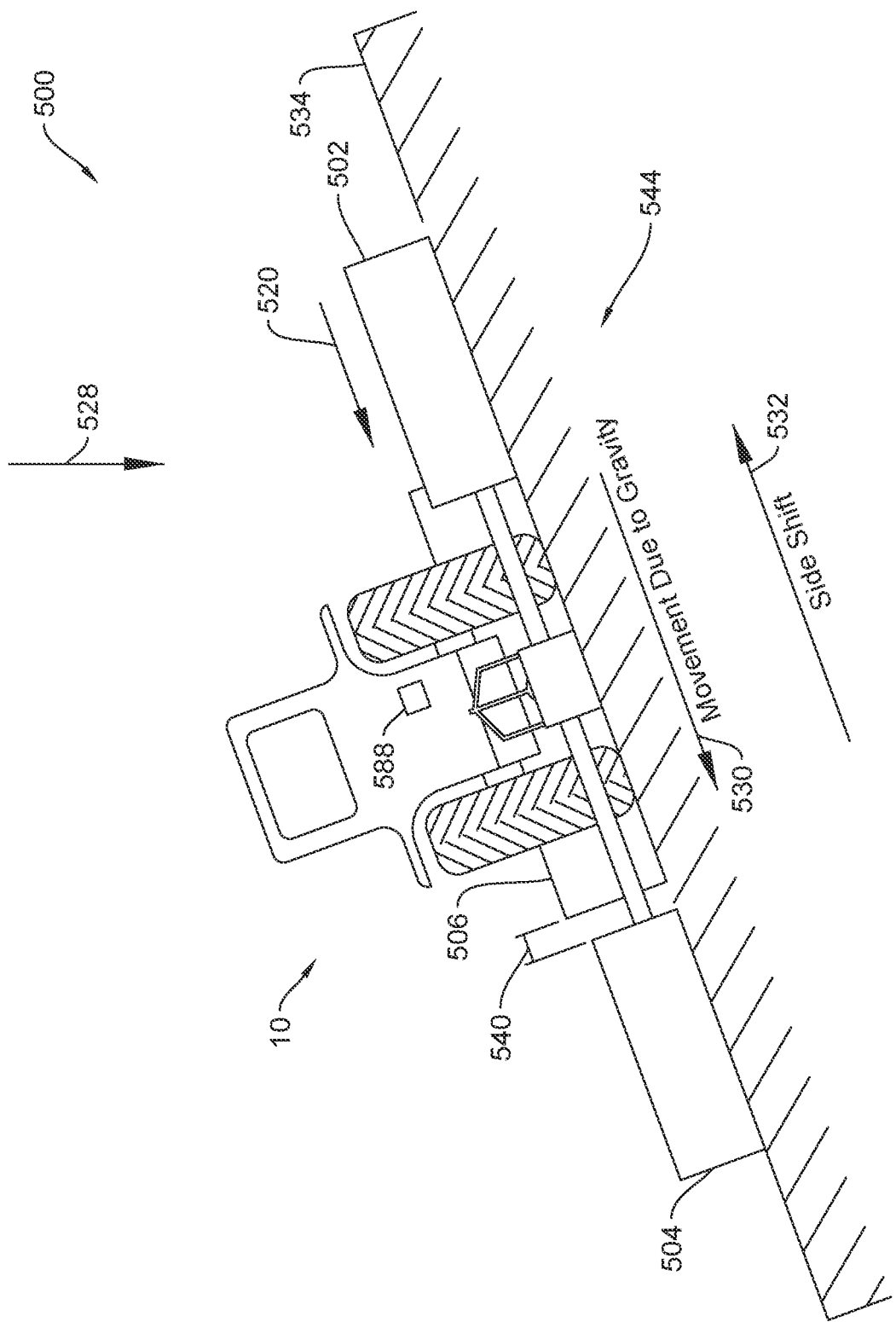
FIG. 5 illustrates the vehicle of FIG. 1 operating in an inclination event, according to an exemplary embodiment.

Turning now to FIG. 5, a side-shifting adjustment system 500 of vehicle 10 is shown operating on an incline 534 (i.e., an inclination event). While the vehicle 10 operates on an inclined slope, a force of gravity 528 is exerted on the front-mounted mower 506 and rear-mounted mowers 544, causing the front-mounted mower 506 and the rear-mounted mowers 544 to move down the incline 534. In some embodiments, if the vehicle 10 is traversing the incline (as shown in FIG. 5), the movement due to gravity 530 may result in a lack of overlap 540 between the cutting of front-mounted mower 506 and rear-mounted mowers 544. Thus, a lateral side-shift adjustment 532 may be utilized by the vehicle 10 to compensate for the movement due to gravity 530 and ensure proper mowing coverage. In some embodiments, only one of the rear-mounted mowers 544 may adjust laterally. For example, the left rear-mounted mower 504 may adjust laterally to compensate for overlap 540 while right rear-mounted mower 502 is not adjusted. In some embodiments, both rear-mounted mowers 544 adjust laterally. The side adjustment may be executed through the use of hydraulics (e.g., hydraulic system 588) on the tractor or a hydraulic system on the rear-mounted mowers 544. Alternatively or in addition to, pneumatics or electrical actuators may be used to laterally adjust the mowers.

Similar to FIGS. 4A-4C, the vehicle 10 of FIG. 5 may use load sensors 408, 410 (or any other suitable force/pressure sensor) to determine the lateral load 520 applied to the front-mounted mower 506 due to the force of gravity 528. Similarly, vehicle 10 of FIG. 5 may use any of the means further described in FIGS. 4A-4C to laterally adjust the rear-mounted mowers 544 to compensate for the lack of overlap 540 caused by the movement due to gravity 530. While the front-mounted mower 506 is shown shifting to the left of the vehicle 10, it should be understood that the front-mounted mower 506 may move either left of right of the vehicle due to gravity, and a corresponding lateral side-shift adjustment 532 (in a direction opposite of the movement due to gravity 530) may be applied to compensate.

Turning now to FIG. 6, a lateral-adjustment system 600 for laterally adjusting mowers (e.g., rear-mounted mowers 444 of FIG. 4B) to compensate for lateral loads applied (e.g., 420 of FIG. 4A) to front-mounted mowers (e.g., front-mounted mower 406 of FIG. 4A-4C). Lateral-adjustment system 600 includes a controller 602, a force sensor A 624, a force sensor B 626, the operator interface 40, the control system 96, the driveline 50, the braking system 100, an implement system 618, a network 620, a database 636, and a remote user device 638.

The controller 602 comprises, in some embodiments, processing circuitry 604, a processor 606, and memory 608. In some embodiments, the controller 602 is configured to control the operation of the vehicle 10 and any implements (e.g., mowers) attached thereto and part of the implement system 618. The memory 608 may contain one or more instructions that, when executed by the processor 606, cause the processor 606 to perform one or more of the actions described herein. For example, memory 608 may include a side-shift correction module 628. In some embodiments the memory 608 is in communication with the processor 606. Processor 606 may include one or more modules, that when executed, may perform one or more of the actions described herein.

The side-shift correction module 628 may receive data and/or signals from force sensor A 624 and force sensor B 626. The side-shift correction module 628 may further use the received data and/or signals from force sensor A 624 and force sensor B 626 to determine various characteristics and attributes of a turning event or inclination event of vehicle 10. For example, a turning event may be an event in which the operator (whether human or software, and whether local or remote) transmits an instruction to adjust the steering angle of vehicle 10 which causes the vehicle 10 to progress in a turning manner. In other embodiments, the operator may selectively apply a brake to one or more of the tractive elements (e.g., 440, 442) to cause a turning event. A turning event may occur at any speed or any turning magnitude. An inclination event is an event in which a vehicle is traversing an incline, as shown in FIG. 5. During the inclination event, the force of gravity causes the mowers (e.g., rear-mounted mowers 402, 404, and front-mounted mower 406 of FIGS. 4A-4C) to move laterally down the incline.

Controller 602 is configured to control the operation of various components of the vehicle 10. The controller 602 may receive information (e.g., sensor data, user inputs, etc.) or provide information (e.g., commands, etc.) to a variety of components to facilitate operation of the vehicle 10. According to the exemplary embodiment of FIG. 6, the controller 602 is operatively coupled to the prime mover 52, the energy storage 54, the transmission 56, the transfer case 58, the braking system 100, the implement system 618, and the operator interface 40. In other embodiments, the controller 602 is operatively coupled to different components.

In some embodiments, the controller 602 is configured to provide information (e.g., commands) to control the prime mover 52 (e.g., activating or deactivating the prime mover 52, controlling the output power, etc.), the energy storage 54 (e.g., controlling the rate of discharge, etc.), the transmission 56 (e.g., controlling shifting, etc.), the transfer case 58 (e.g., controlling engagement of the front output and the rear output, etc.), the braking system 100 (e.g., to provide a braking force, etc.), the implement system 618 (e.g., to actuate the lateral adjuster 634 to laterally adjust the implement during a turn event or inclination event), the hydraulic system 488 (e.g., extend or retract various hydraulic components), and the operator interface 40 (e.g., to provide specific information to the operator, etc.). The controller 602 may provide electrical signals, pneumatic signals (e.g., by controlling a valve or compressor), hydraulic signals (e.g., by controlling a valve or pump), or mechanical signals (e.g., by applying a force to a linkage or cable, etc.) to facilitate control of the vehicle 10. By way of example, the controller 602 may control the lateral adjustment movements of implement system 618. In some embodiments, the implement system 618 is a triple mower configuration coupled to the vehicle 10 with the front-mounted mower 406 and the rear-mounted mowers 444.

In some embodiments, the controller 602 is configured to receive information from the prime mover 52 (e.g., engine speeds, engine temperatures, etc.), the energy storage 54 (e.g., a charge level of a battery, a fill level of a fuel tank, etc.), the transmission 56 (e.g., the current gear, etc.), the transfer case 58 (e.g., which of the front output 60 and the rear output 62 are engaged, etc.), the braking system 100 (e.g., the current engaged/disengaged state, etc.), the implement system 618 (e.g., the current lateral/vertical position and speed), sensors 624, 626, the hydraulic system 488, and the operator interface 40 (e.g., commands provided by an operator, etc.). Each of these components may include sensors to facilitate transferring information to the controller 602. In some embodiments, the processor 606 executes the operations of the controller 602 as described above.

The operator interface 40 comprises, in some embodiments, an input device 630 and an output device 632. In some embodiments, the input device 630 and output device 632 are communicably coupled. The input device 630 is also communicably coupled to the controller 602. The output device 632 is also communicatively coupled to the controller 602. The input device 630 is configured to receive input from a user operating vehicle 10. The operator interface 40 may include one or more input devices 630 configured to receive an input from the user. By way of example the operator interface 40 may include one or more switches, knobs, dials, styluses, touch screens, microphones, or other input devices. The output device 632 may include one or more output devices configured to provide information to the user. By way of example, the output device 632 may include one or more screens, lights, speakers, haptic feedback devices, or other output devices. In some embodiments the operator interface 40 is positioned within the cab 30, such that the operator can interact with the user interface 40 to control the vehicle 10 while positioned within the cab 30.

The force sensors 624, 626 are, in some embodiments, load cells (e.g., load cells 408, 410 of FIGS. 4A-4C). The force sensors 624, 626 may also be any other suitable means for measuring loads or acceleration as described herein. The force sensors 624, 626 may include circuitry to facilitate the transferring of information to the controller 602. The force sensors 624, 626 are operatively coupled to the controller 602 and positioned to measure the force/load applied to the front-mounted mower 406 during a turning event or inclination event. By way of example, the force sensors may be positioned on the front hitch 416 or one at each of the connection points between the front hitch 416 and the front-mounted mower 406. During a lateral load event (e.g., during a turning event or inclination event), force sensor A 624 will experience a compression load and force sensor B 626 will experience a tension load. The processor can then execute the side-shift correction module 628 to determine the direction of the load (and then by extension, the direction of turn or incline) and make a compensating adjustment to the rear-mounted mowers 444 to ensure optimal mower overlap. In some embodiments, only one force sensor 624, 626 is used to determine the lateral load on the front-mounted mower 406.

The control system 96 comprises, in some embodiments, processing circuitry to receive signal outputs from controller 602 (e.g., outputted signals from the processor 606 executing the side-shift correction module 628) and transmit control signals to the driveline 50, the braking system 100, the hydraulic system 488, and the implement system 618. In some embodiments, the controller 602 transmits control signals directly to the driveline 50, the braking system 100, hydraulic system 488, and the implement system 618. In other embodiments, the control system 96 transmits the control signals to the driveline 50, the braking system 100, the hydraulic system 488, and the implement system 618. The driveline 50 may include various components as further described in FIGS. 1-3. the braking system 100 may include various components as further described in FIGS. 1-3. The hydraulic system 488 may include various components as further described in FIGS. 4A-4C.

The implement system 618 comprises, in some embodiments, a front hitch 416, a front PTO 421, a rear hitch 418, a rear PTO 419, a hydraulic system 488, a lateral adjuster 634, and at least one implement. The front hitch 416 may be any suitable hitching mechanism to couple a front implement to the front portion of the vehicle 10. For example, the front hitch 416 may be a front loader arm, a three-point hitch, a ball hitch, etc. The front PTO 421 may be configured to operatively couple to the front implement to actuate the front implement (e.g., raise, lower, spin, and otherwise move). The front PTO 421 may be operatively coupled to the prime mover 52 and caused to operate through the movement of the prime mover 52. The rear PTO 419 may similarly be configured, but at the rear portion of the vehicle 10 and configured to operate and/or actuate a rear implement.

The hydraulic system 488 may be housed on the vehicle 10, the front implement, or rear implement. The hydraulic system 488 may be used to operate the at least one implement (e.g., actuate the mower blades). In other embodiments, the hydraulic system 488 may also adjust the front hitch 416 and the rear hitch 418 both laterally and vertically. In other embodiments, the hydraulic system may be used to adjust the mowers laterally through an adjustment mechanism in the center member 403 (e.g., through the use of pistons and cylinders to shift the rear-mounted mowers 444). The hydraulic system 488 comprises a hydraulic pump, a control valve, hydraulic cylinders, and hydraulic hoses. When the operator activates the hydraulic system 488, the pump generates pressure, which is used to operate the cylinders and move the implement or hitch components.

For example, to adjust the height of the hitch (and by extension, the implement), the operator activates the hydraulic system 488, which raises or lowers the hitch using the hydraulic cylinders. The operator can control the height of the implement using the input device 630, such as a control lever or other control mechanism in the vehicle's cab.

To adjust the lateral position of the hitch, the operator adjusts the lengths of the links. This may be done by using a control lever of the input device 630 or other mechanism in the vehicle's cab to lengthen or shorten the links. In other embodiments, the controller 602 automatically adjusts the position of the hitch laterally by sending signals either directly to the hydraulic system 488 (e.g., the lateral adjuster 634) or through the control system 96.

The hydraulic system 488 can also be used to operate other hydraulic functions on the vehicle 10 or implement system 618, such as powering a hydraulic motor or opening and closing valves. This allows for a wide range of flexibility and control over the operation of the vehicle and implement.

In some embodiments, the lateral-adjustment system 600 includes a network 620 through which to communicate with various remote devices and servers communicably coupled to the network 620. According to an embodiment, the controller 602 is communicably coupled to the network 620, wherein a database 636 is also communicably coupled to network 620. The database 636 may be hosted by a remote server communicably coupled to the network 620. In some embodiments, the database 636 stores information, algorithms, or other software related to lateral loads, turning/inclination events, maps, and calibrations between such. Such information may include calculations and formulas to determine optimal adjustments of the implement system based on received sensor data. In some embodiments, the side-shift correction module 628 is hosted on the database 636 and/or a remote user device 638. In other embodiments the database 636 is stored locally in memory 608. The memory 608 may include instructions, that when executed by the processor 606, output a signal to adjust the lateral position of the implement system 618 (e.g., the rear-mounted mowers 444 or front-mounted mower 406).

In some embodiments, the vehicle 10 is remotely controlled by remote user device 638. In such embodiments, the controller 602 may receive, through the network 620, signals from remote user device 638 to control the driveline 50, braking system 100, or implement system 618. In other embodiments, a user may adjust various operating parameters of the vehicle 10 through the use of remote user device 638. For example, the user may input a modification to an operating parameter of vehicle 10 at remote user device 638.

The modification may be transmitted to the controller 602 by the network 620. The controller may then execute the modification by sending a control signal to the control system 96 or directly to the various components to be modified. The controller 602 may include a communication interface module to facilitate communication to and from the network 620.

Figure 7:
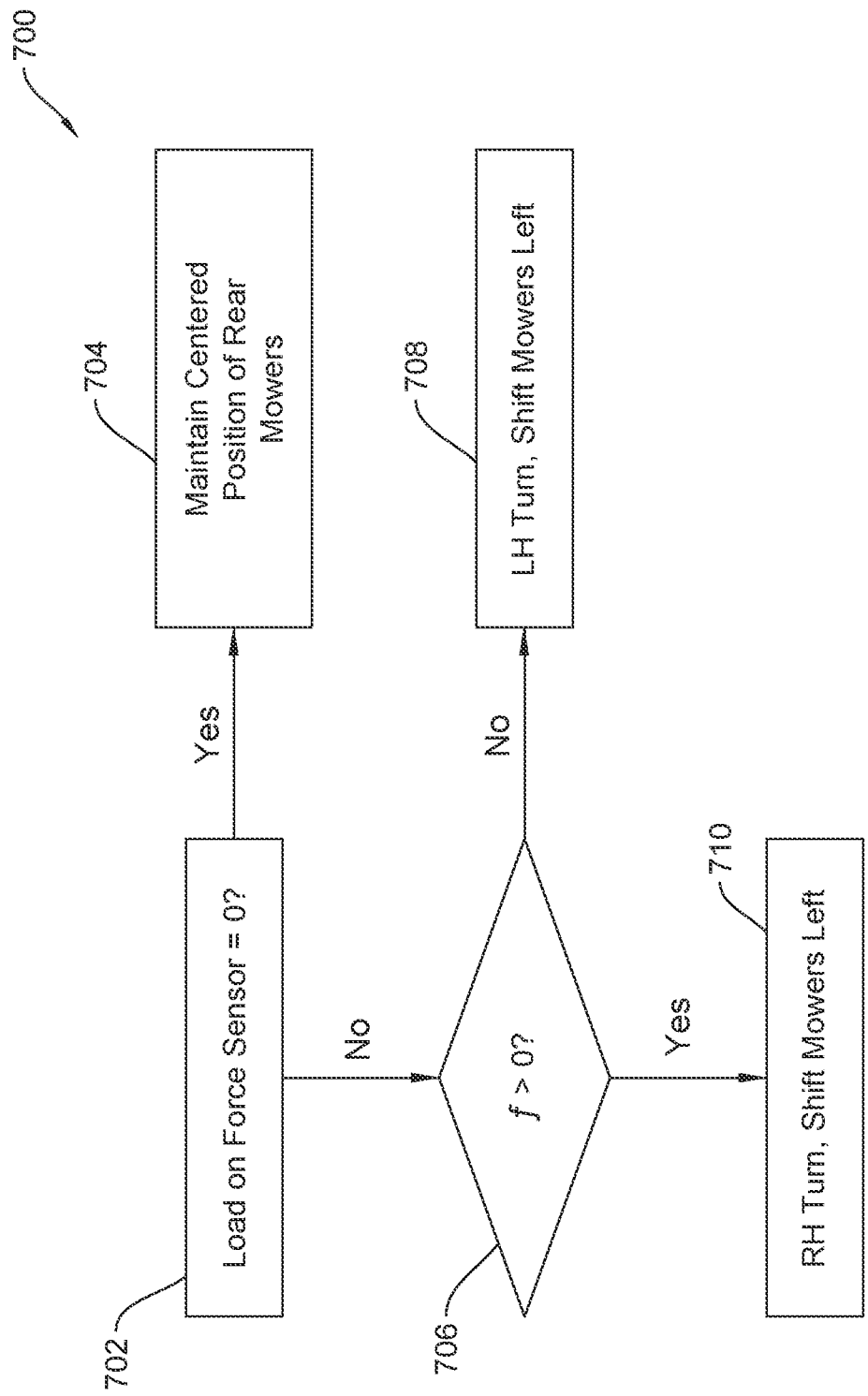
FIG. 7 is a flow diagram of a process to laterally adjust a mower coupled to the vehicle of FIG. 1, according to an exemplary embodiment.

Turning now to FIG. 7, a lateral-adjustment flow diagram 700 is shown. Lateral-adjustment flow diagram 700 may include step 702, step 704, step 706, step 708, and step 710. The lateral-adjustment flow diagram 700 is an exemplary embodiment of the present disclosure as executed by the controller 602 of FIG. 6.

Step 702 may include determining whether there is a load on a force sensor (e.g., load cells 408, 410). Determining whether there is a load may be determined if the force sensor experiences a compressive or tensile motion or force. In other embodiments, a load may be determined by whether there is a contact between two components, thus sending a signal of contact to the controller 602. In some embodiments, the lateral load is determined on a binary paradigm (i.e., there is either a load or not a load). In other embodiments, the lateral load is determined on a scale (i.e., the amount of lateral load is determined). While step 702 illustrates determining whether the load on the force sensor is 0, it should be understood that any load amount threshold or range may be used at step 702 to allow for calibration or filtering of noise in the signal from the force sensor or for personal preference of the operator.

If the load on the force sensor is 0 (or otherwise within a predetermined threshold), step 704 is executed. Step 704 maintains a centered position of rear-mounted mowers 444. This may be accomplished by using the rear hitch 418 and the hydraulic system 488 to adjust the rear hitch 418 components or making some other lateral adjustment (e.g., extending or retracting telescoping draft links/arms, tightening or loosening sway chains, steering an implement tractive element, adjusting an internal component of the implement, etc.).

If at step 702, there is a load on the force sensor (or otherwise outside of a predetermined threshold), step 706 is executed. Step 706 determines whether the force sensor from step 702 is below or above the threshold (e.g., 0). In some embodiments, if the load is above the threshold, then the force sensor is experiencing a compressive force. If the load is below the threshold, then the force sensor is experiencing a tensile force. In other embodiments, if the load is above the threshold, then then force sensor is experiencing a tensile force. If the load is below the threshold, then the force sensor is experiencing a compressive force.

Again, in some embodiments, instead of determining whether the force sensor is experiencing a force above or below 0, in step 706, it is determining whether the force sensor is experiencing a force above or below a threshold (e.g., −5 lbs-5 lbs). This allows for incidental loads occurring during mowing (or other implement work) without lateral adjustments constantly being made. These incidental loads may occur due to variations in the ground, hitting an obstacle with a blade, etc.

In the illustrative embodiment as shown in FIG. 7, if the load on the force sensor is below the predetermined threshold, then step 708 is executed and it is determined that the vehicle 10 is in a left-hand turning event, and the implement system should be laterally adjusted to the right to ensure optimal mower overlap coverage. If the determination is made that the load experience by the force sensor is greater than the predetermined threshold, then step 710 is executed and it is determined that the vehicle 10 is in a right-hand turning event, and the implement system should be laterally adjusted to the left to ensure optimal mower overlap coverage.

It should be understood that the steps and operations described in FIG. 7 above may be performed by the various components described herein (e.g., the controller 602, vehicle 10, implement system 618, control system 96, processor 606, force sensors 624, 626, etc.).

Figure 8:
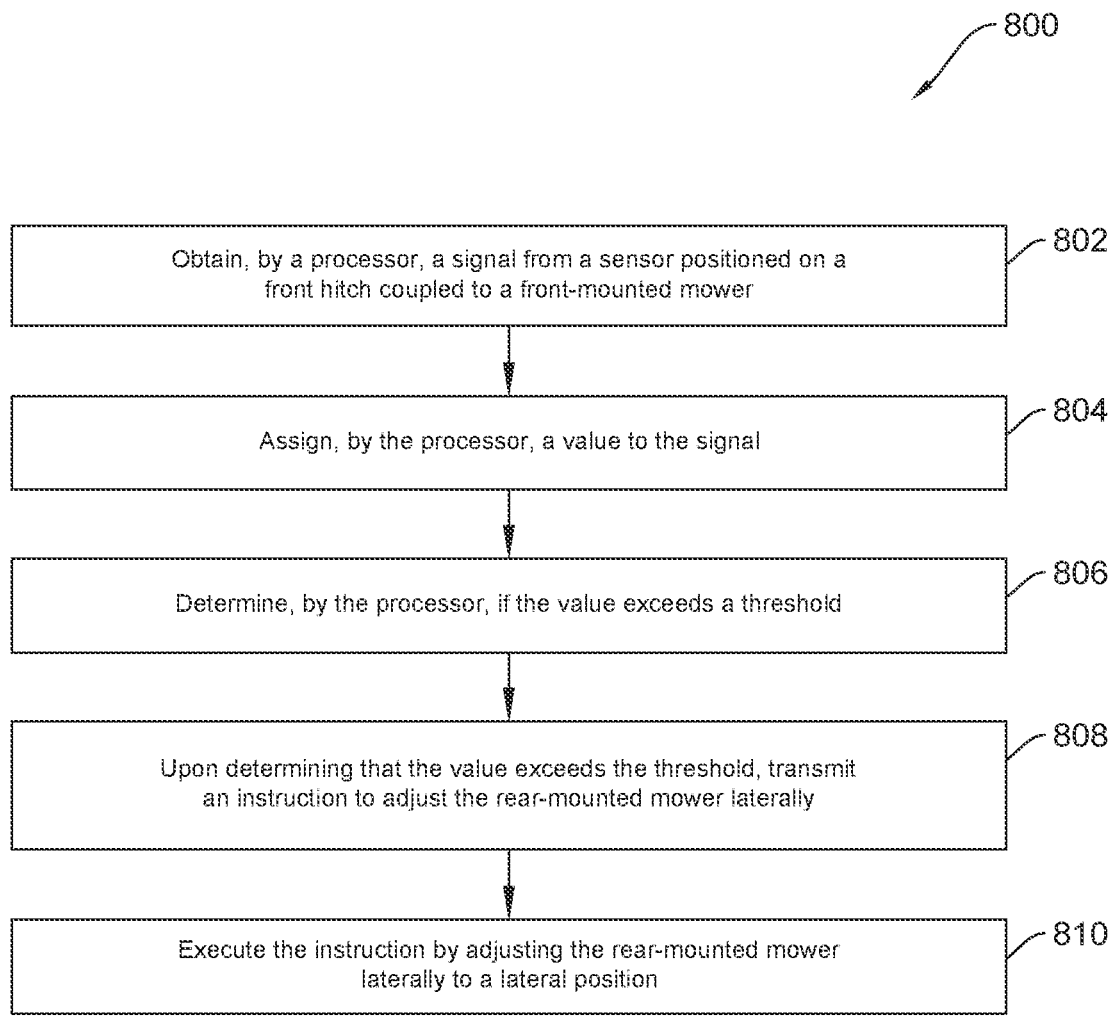
FIG. 8 is a flow diagram of a process to laterally adjust a mower coupled to the vehicle of FIG. 1, according to an exemplary embodiment.

Turning now to FIG. 8, a process 800 of laterally adjusting a rear-mounted mower (e.g., rear-mounted mowers 444) is shown. FIG. 8 comprises the steps of obtain a signal from a sensor positioned on a front hitch coupled to a front-mounted mower (step 802), assign a value to the signal (step 804), determine if the value exceeds a threshold (step 806), upon determining that the value exceeds the threshold, transmit an instruction to adjust a rear-mounted mower laterally (step 808), execute the instruction by adjusting the rear-mounted mower laterally to a lateral position (step 810).

At step 802, the processor 606 obtains a signal from the sensor (e.g., load cell 408) positioned on the front hitch 416 coupled to the front-mounted mower 406. The sensor and the processor 606 are communicably coupled together by wire (e.g., ISOBUS) or wirelessly (e.g., through the use of various wireless communication protocols, including, but not limited to, Wi-Fi, cellular, Bluetooth, etc.). The processor 606 may include filtering capabilities to filter the signal received from the sensor to account for noise in the signal. The processor 606 may further include amplifiers to amplify the signal received from the sensor to an amount usable by the processor 606.

At step 804, the processor 606 assigns a value to the signal. Through the use of calibrations and mapping, the processor may be configured to translate the signal to a value representative of a turning event. The value may include one or more values to represent a steering angle, a turn radius, a ground speed, a lateral load, etc. In another embodiment, the value represents an incline angle, rate of ascent or descent of the vehicle 10, etc. In an exemplary embodiment, the processor translates the signal to a lateral load amount as experienced by the sensor. This value may be positive or negative to account for both compressive and tensile forces. In some embodiments, the processor is configured, through calibration, to translate a compressive/tensile load as experienced by the sensor into a lateral load as experienced by the front-mounted mower 406. In other embodiments, the sensor may be mounted to the rear-mounted mowers 444 and used to determine the lateral load as experienced by the rear-mounted mowers 444.

At step 806, the processor 606 (in executing the side-shift correction module 628) may determine if the value assigned in step 804 exceeds a predetermined threshold. The predetermined threshold may be set by the operator of the vehicle 10 through user input device 630. The predetermined threshold may be a singular value (e.g., "0") or a range of values (e.g., "−5–5"). The threshold may be unitless or attached to a unit (e.g., pounds of force). Alternatively, the predetermined threshold may be determined remotely by a user of remote user device 638 or database 636. In other embodiments, the operator of vehicle 10 may modify the predetermined threshold based on a set of criteria. For example, when the operator may set a predetermined threshold for a turning event, but also a second predetermined threshold for an inclination event. In some embodiments, the predetermined threshold may be communicated to other vehicles with a fleet to be used in fleet-wide lateral-adjustments.

At step 808, the processor 606 transmits an instruction to adjust the rear-mounted mowers 444 upon determining that the value exceeds the predetermined threshold. The processor 606 may transmit control signals or instructions to a control system that will provide control signals to the implement system 618 (or lateral adjuster 634) to laterally shift the rear-mounted mowers 444. In other embodiments, the processor 606 sends the control signals directly to the implement system 618. In some embodiments, the controller 602 includes the control system 96. The instruction may be any form of signal, including, but not limited to, a control signal, an electrical signal, a hydraulic signal, a fluid signal, mechanical signals etc.

At step 810, the instruction to adjust the rear-mounted mowers 444 laterally to a lateral position is executed. This instruction may be executed by various components of the present disclosure. For example, the instruction may be executed by the rear hitch 418, front hitch 416, vehicle 10, implement system 618, the front PTO 421, the rear PTO 419, the front-mounted mower 406, and rear-mounted mowers 444. The execution may be accomplished by actuating hydraulic cylinders (e.g., hydraulic cylinders coupled to the rear hitch 418 or the front hitch 416), actuating mechanical linkages, actuating electrical components (e.g., solenoids, motors, piezoelectric motors, etc.), etc. The execution may occur on the implement system 618 or the vehicle 10. In some embodiments, a single rear-mounted mower 402, 404 is adjusted to ensure optimal mowing overlap. In some embodiments the tractive element coupled to the implement system is turned to adjust the lateral position of the rear-mounted mowers. In other embodiments, the lateral adjustment is executed by the extending or retracting arms on the rear hitch. In other embodiments, the lateral adjustment is executed by ball or lead screws on the implement itself, laterally adjusting the mowers.

It should be understood that the descriptions in the present disclosure may apply to any implement coupled to vehicle 10, including plows, rakes, balers, plows, ploughs, planters, cultivators, bush hogs, rototillers, painters, sprayers, etc.

As utilized herein with respect to numerical ranges, the terms "approximately," "about," "substantially," and similar terms generally mean+/−10% of the disclosed values, unless specified otherwise. As utilized herein with respect to structural features (e.g., to describe shape, size, orientation, direction, relative position, etc.), the terms "approximately," "about," "substantially," and similar terms are meant to cover minor variations in structure that may result from, for example, the manufacturing or assembly process and are intended to have a broad meaning in harmony with the common and accepted usage by those of ordinary skill in the art to which the subject matter of this disclosure pertains. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References herein to the positions of elements (e.g., "top," "bottom," "above," "below") are merely used to describe the orientation of various elements in the figures. It should be noted that the orientation of various elements may differ according to other exemplary embodiments, and that such variations are intended to be encompassed by the present disclosure.

The present disclosure contemplates methods, systems, and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

The term "client or "server" include all kinds of apparatus, devices, and machines for processing data, including by way of example a programmable processor, a computer, a system on a chip, or multiple ones, or combinations, of the foregoing. The apparatus may include special purpose logic circuitry, e.g., a field programmable gate array (FPGA) or an application specific integrated circuit (ASIC). The apparatus may also include, in addition to hardware, code that creates an execution environment for the computer program in question (e.g., code that constitutes processor firmware, a protocol stack, a database management system, an operating system, a cross-platform runtime environment, a virtual machine, or a combination of one or more of them). The apparatus and execution environment may realize various different computing model infrastructures, such as web services, distributed computing and grid computing infrastructures.

The systems and methods of the present disclosure may be completed by any computer program. A computer program (also known as a program, software, software application, script, or code) may be written in any form of programming language, including compiled or interpreted languages, declarative or procedural languages, and it may be deployed in any form, including as a stand-alone program or as a module, component, subroutine, object, or other unit suitable for use in a computing environment. A computer program may, but need not, correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform actions by operating on input data and generating output. The processes and logic flows may also be performed by, and apparatus may also be implemented as, special purpose logic circuitry (e.g., an FPGA or an ASIC).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data (e.g., magnetic, magneto-optical disks, or optical disks). However, a computer need not have such devices. Moreover, a computer may be embedded in another device (e.g., a vehicle, a Global Positioning System (GPS) receiver, etc.). Devices suitable for storing computer program instructions and data include all forms of non-volatile memory, media and memory devices, including by way of example semiconductor memory devices (e.g., EPROM, EEPROM, and flash memory devices; magnetic disks, e.g., internal hard disks or removable disks; magneto-optical disks; and CD ROM and DVD-ROM disks). The processor and the memory may be supplemented by, or incorporated in, special purpose logic circuitry.

To provide for interaction with a user, implementations of the subject matter described in this specification may be implemented on a computer having a display device (e.g., a CRT (cathode ray tube), LCD (liquid crystal display), OLED (organic light emitting diode), TFT (thin-film transistor), or other flexible configuration, or any other monitor for displaying information to the user. Other kinds of devices may be used to provide for interaction with a user as well; for example, feedback provided to the user may be any form of sensory feedback (e.g., visual feedback, auditory feedback, or tactile feedback).

Implementations of the subject matter described in this disclosure may be implemented in a computing system that includes a back-end component (e.g., as a data server), or that includes a middleware component (e.g., an application server), or that includes a front end component (e.g., a client computer) having a graphical user interface or a web browser through which a user may interact with an implementation of the subject matter described in this disclosure, or any combination of one or more such back end, middleware, or front end components. The components of the system may be interconnected by any form or medium of digital data communication (e.g., a communication network). Examples of communication networks include a LAN and a WAN, an inter-network (e.g., the Internet), and peer-to-peer networks (e.g., ad hoc peer-to-peer networks).

It is important to note that the construction and arrangement of the vehicle 10 and the systems and components thereof (e.g., the driveline 50, the braking system 100, the control system 96, etc.) as shown in the various exemplary embodiments is illustrative only. Additionally, any element disclosed in one embodiment may be incorporated or utilized with any other embodiment disclosed herein.

The invention claimed is:

1. A system comprising:
    an agricultural vehicle;
    a rear-mounted mower coupled to the agricultural vehicle by a rear hitch;
    a front-mounted mower coupled to the agricultural vehicle by a front hitch; and
    a control system configured to control the rear-mounted mower, the control system comprising processing circuitry configured to:
        obtain a signal from a sensor, the sensor positioned on the front hitch coupled to the front-mounted mower, wherein the signal corresponds to a lateral load applied to the front-mounted mower;
        assign a value to the signal;
        determine if the value exceeds a threshold;
        upon determining that the value exceeds the threshold, transmit an instruction to adjust the rear-mounted mower laterally; and
        execute the instruction by adjusting the rear-mounted mower laterally to a lateral position.

2. The system of claim 1, wherein the sensor is a load cell.

3. The system of claim 1, wherein the sensor is configured to measure a lateral load exerted on the front-mounted mower.

4. The system of claim 1, wherein the processing circuitry is further configured to obtain a second signal, from a second sensor positioned on the front hitch, wherein the second sensor is configured to measure a lateral load on the front-mounted mower.

5. The system of claim 1, wherein the processing circuitry is further configured to adjust the rear-mounted mower to the lateral position by adjusting the rear hitch coupled to the rear-mounted mower.

6. The system of claim 1, wherein the processing circuitry is further configured to, upon the value not exceeding the threshold, transmit a second instruction to adjust the rear-mounted mower laterally to a central position.

7. The system of claim 1, wherein the processing circuitry is further configured to determine a steering angle from the value.

8. A control system comprising processing circuitry configured to:
    obtain a signal from a sensor, the sensor positioned on a front hitch coupled to a front-mounted mower, wherein the signal corresponds to a lateral load applied to the front-mounted mower;
    assign a value to the signal;
    determine if the value exceeds a threshold;
    upon determining that the value exceeds the threshold, transmit an instruction to adjust a rear-mounted mower laterally; and
    execute the instruction by adjusting the rear-mounted mower laterally to a lateral position.

9. The control system of claim 8, wherein the sensor is a load cell.

10. The control system of claim 8, wherein the sensor is configured to measure a lateral load on the front-mounted mower.

11. The control system of claim 8, wherein the processing circuitry is further configured to obtain a second signal from a second sensor and assign a second value to the second signal.

12. The control system of claim 8, wherein the processing circuitry is further configured to adjust the rear-mounted mower to the lateral position by adjusting a rear hitch coupled to the rear-mounted mower.

13. The control system of claim 8, wherein the processing circuitry is further configured to, upon the value not exceeding the threshold, transmit a second instruction to adjust the rear-mounted mower laterally to a central position.

14. The control system of claim 8, wherein the processing circuitry is further configured to determine a steering angle from the value.

15. A method comprising:
    obtaining, by a processor, a signal from a sensor positioned on a front hitch coupled to a front-mounted mower, wherein the signal corresponds to a lateral load applied to the front-mounted mower;
    assigning, by the processor, a value to the signal;
    determining, by the processor, if the value exceeds a threshold;
    upon determining that the value exceeds the threshold, transmitting, by the processor, an instruction to adjust a rear-mounted mower laterally; and
    executing, by the processor, the instruction by adjusting the rear-mounted mower laterally to a lateral position.

16. The method of claim 15, wherein the sensor is a load cell.

17. The method of claim 15, wherein the sensor is configured to measure a lateral load on the front-mounted mower.

18. The method of claim 15, further comprising obtaining, by the processor, from a second sensor positioned on the front-mounted mower, wherein the second sensor is configured to measure a lateral load on the front-mounted mower.

19. The method of claim 15, further comprising adjusting the rear-mounted mower to the lateral position by adjusting a rear hitch coupled to the rear-mounted mower.

20. The method of claim 15, further comprising transmitting a second instruction to adjust the rear-mounted mower laterally to a central position upon the value not exceeding the threshold.

* * * * *